United States Patent [19]

Kurogi et al.

[11] Patent Number: 4,735,422
[45] Date of Patent: Apr. 5, 1988

[54] PRECISION CHUCK

[75] Inventors: Yoshihito Kurogi; Tatsuei Sawaguchi, both of Hiroshima, Japan

[73] Assignee: Kabushiki Kaisha Kitagawa Tekkosho, Moto, Japan

[21] Appl. No.: 905,652

[22] Filed: Sep. 9, 1986

[30] Foreign Application Priority Data

Sep. 13, 1985 [JP] Japan .................................. 60-201667
Dec. 28, 1985 [JP] Japan .................................. 60-299472
Mar. 14, 1986 [JP] Japan .................................. 61-57200

[51] Int. Cl.$^4$ .............................................. B23B 31/16
[52] U.S. Cl. ..................................... 279/121; 279/110; 279/123
[58] Field of Search ................... 279/121, 123, 66, 110

[56] References Cited

U.S. PATENT DOCUMENTS 3,814,451 6/1974 Röhm ................................... 279/121

FOREIGN PATENT DOCUMENTS 1381146 1/1975 United Kingdom ................. 279/121

Primary Examiner—Gil Weidenfeld
Assistant Examiner—Steven C. Bishop

[57] ABSTRACT

A chuck of the type having a body with a plunger that moves axially and is operably connected with wedges that move the jaws radially in response to movement of the plunger. The body is formed with guide surfaces, which maintain contact with the plunger at all times, and also with bearing surfaces which support peripheral surfaces of the wedges.

17 Claims, 18 Drawing Sheets

PRECISION CHUCK

BACKGROUND OF THE INVENTION

The present invention relates a chuck for holding a workpiece by a wedge action on a machine tool and more particularly a precision chuck capable of holding a workpiece by a stronger holding force with a high degree of accuracy.

A chuck of the type described above is, for example, disclosed in Japanese Patent Publication No. 57-46965 and is shown in FIGS. 1 and 2. In this chuck, an axially movable annular plunger 3 is fitted into a central bore 2 formed through a body 1 and is formed with a plurality of equiangularly spaced apart T-shaped wedge grooves 4. The body 1 is formed with a plurality of axially extended guide grooves 5 into which are axially slidably fitted master jaw 6 connected top jaw adapted to chuck a workpiece. The rear inner end portion remote from the corresponding top jaw of the master jaw 6 is formed with a T-shaped wedge portion 7 adapted to fit into the corresponding T-shaped wedge groove 4 of the plunger 3. The front surface of the master jaw 6 is formed with front guided surfaces 8 while the rear surface thereof is formed with rear guided surfaces 9 and these front and rear guided surfaces 8 and 9 are in opposed relationship with side surfaces 10 of the guide groove 5 of the body 1. A cover 11 for preventing the intrusion of chips and dust particles is fitted into the plunger 3.

The chuck with the above-described construction has a defect that the length L of the contact between the side surface 10 of the guide groove 5 of the body 1 and the front guided surface 8 of the master jaw 6 is greater than the length 1 of the contact between the side surface 10 of the guide groove 5 of the body 1 and the rear guided surface 9 of the master jaw 6 that is, $L>1$.

Because of this difference in the length of contact, there exists a great difference in the displacement or floating of the master jaw 6 under an external force between the time when the external peripheral surface of a workpiece is held and the time when the internal peripheral surface of a workpiece is held so that it results in a difference in workpiece holding accuracy between the case in which the inner peripheral surface of a workpiece is held and the case in which the outer peripheral surface of a workpiece is held. In addition, the friction between the rear guided surface 9 of the master jaw 6 with the body is greater than the friction between the front guided surface 8 of the master jaw 6 with the body, the rear guided surface 9 is quickly worn out.

As a result, the workpiece-holding-accuracy in the case of holding the inner peripheral surface of a workpiece 13 becomes lower than in the case of holding the outer peripheral surface of a workpiece 13 and moreover there arises the problem that the sliding resistance encountered by the master jaw 6 in case of holding the inner peripheral surface of a workpiece becomes higher than that in case of holding the outer peripheral surface of a workpiece.

In order to eliminate the above and other defects encountered in the prior art chucks, Japanese Patent Application Laid-Open No. 60-94207 discloses a chuck as shown in FIGS. 3 and 4. The chuck has a two-split body 20 consisting of an axially front body section 21A and an axially rear body section 21B and a center hole 22 is bored through the front and rear body sections 21A and 21B. The front body section 21A is provided with a plurality of axially extended guide grooves or recesses 23 and a master jaw 24 is slidably fitted into respective guide grooves or recesses 23 for slidable movement in the axial direction of the front body section 21A. An annular cylinder 25 is interposed between the front and rear body sections 21A and 21B and an annular piston 26 is fitted into the cylinder 25 for slidable movement in the axial direction. One end of the piston 26 is made into threadable engagement with a base portion 28 of a plurality of wedges 27 which are in opposed relationship with the master jaw 24. Each wedge 27 is provided with a pair of wedge main bodies 29 which are extended from the base portion 28 and which are spaced apart from each other by a predetermined distance. Each wedge main body 29 is so tapered that its height (or thickness) is gradually increased toward its front end. Meanwhile each master jaw 24 is formed with tapered guide surfaces 30 on both sides of the radial centerline thereof for engagement with the wedge main bodies 29 extended from the base portion 28.

With the above-described construction, the wedge main bodies 29 of the wedge 27 are made into engagement with each other at the radial centerline of the master jaw 24 so that the workpiece-holding-accuracy can be well balanced as compared with the prior art chuck in which the wedge main bodies 29 are made into engagement with each other at the radially inward portion and at the rear portion in the axial direction of the master jaw 6.

However, the body 20 consists of the front and rear body sections 21A and 21B split in the axial direction so that the guide surface 30 of the front body section 21A which supports the wedge main body 29 of the wedge 27 and the inner peripheral surface of the cylinder 25 of the rear body section 21B which supports the piston 26 threaded into the base portion 28 of the wedge 27 must be machined by completely different machining means and steps. As a result, there arises the problem that it becomes impossible to maintain the guide surface 30 in completely coplanar relationship with the inner peripheral surface of the cylinder 25 in the axial direction.

Because of the above-described problem, only the inner peripheral surface of the cylinder 25 which guides the outer peripheral surface of the sliding piston 26 becomes a reference surface for guiding the wedge 27. As a result, the guide surface 30 cannot support the wedge main bodies 29 in a stable manner so that there is a defect that the base portion of the wedge main body 29 of the wedge 27 is cracked. More particularly, when the driving force exerted to the piston 26 is transmitted through the wedge 27 to the master jaw 24, the relative slidable movement between the inner peripheral surface of the cylinder 25 and the outer peripheral surface of the piston 26 with a minimum gap therebetween is maintained, thereby maintaining a desired degree of workpiece-holding holding-accuracy. Furthermore, the wedge main bodies 29 are merely fitted into axial holes 31 of the front body section 21A and the wedge main bodies 29 of the wedge 27 are made into engagement with the axial holes 31 of the front body section 21A only under the following conditions. In order to maintain a satisfactory degree of workpiece-holding-accuracy in the conventional machining processes, the wedge main bodies 29 are so designed and constructed to have a sufficient degree of rigidy so that they may be used as a cantilever. That is, when the machining force which is externally exerted to a workpiece increases beyond a predetermined point so that excessive loads are exerted to the wedge main bodies 29, the axial holes 31 then support the wedge main bodies 29 to bear part of the excessive loads exerted thereto so that the base portion of the wedge main bodies 29 is prevented from being cracked. In this case, the base portion of the wedge main bodies 29 is considerably deformed so that the workpiece-holding-accuracy is naturally degraded.

Therefore, the chuck disclosed in Japanese Patent Application Laid-Open No. 60-94207 and described above with reference to FIGS. 3 and 4 cannot attain a sufficient holding force and is not adapted to be rotated at high rotational velocities. As a result, it cannot be used in the recently-developed high-rotational-velocity machine tools.

SUMMARY OF THE INVENTION

Unlike the underlying principle of the prior art chucks to prevent breakdowns of component parts due to considerable deformations thereof, the underlying principle of the present invention is to design and construct a precision chuck whose deformation can be reduced to minimum, whereby the workpiece-holding-accuracy can be enhanced. Therefore, one of the objects of the present invention is to provide a precision chuck which can substantially overcome the above and other problems encountered in the prior art chucks based upon the above-described underlying principle of the present invention, which can permit the quick displacement of jaws, which can attain a great holding force and a high degree of workpiece-holding-accuracy and which is adapted to be rotated at high rotational velocities. Furthermore, another object of the present invention is provide a precision chuck in which, in order to attain high degree of workpiece-holding-accuracy unattainable by any prior art chucks, a plunger is securely supported by a body which has a high degree of mechanical strength and which can be machined with a high degree of dimensional accuracy without resorting to different machining means and steps.

In a chuck of the type having a body, a plunger which is axially slidably fitted into the body and is provided with wedges and a plurality of jaws which are operatively coupled to the wedges in such a manner that in response to the displacement of the plunger, they are forced to move in the radial direction of the body, the present invention is characterized in that the engaging portion of each jaw for engagement with the corresponding wedge is defined at the center portion in the radial direction of the jaw; the body has a unitary structure and is formed with guide surfaces which are made into slidable contact with the plunger in the whole range of displacement thereof; and a bearing surface for supporting the inner and/or outer peripheral surface of the wedge is defined in the guide surface.

According to the present invention, the engaging portion of each jaw is defined at the center in the radial direction of the jaw so that the frictions resulting from the sliding contacts between the body and the radial inner and outer portions of the jaw become substantially equal and can be decreased, whereby the quick displacement of the jaws can be ensured. Furthermore, the body is a unitary structure so that it becomes robust. Moreover, the body in the form of a unitary structure as described above is formed with guide surfaces over the whole range of movement of the plunger so that a bearing surface for supporting the inner and/or outer peripheral surface of the wedge can be defined, whereby the plunger can be supported in a stable manner with a high degree of accuracy. In addition, the engagement in the radial direction of the body between the guide groove of the body and the jaw is so maintained that the whole jaw is always located within the guide groove of the body, the displacement of the jaw can be reduced to a minimum in case of holding a workpiece and the workpiece-holding-accuracy can be further enhanced.

DETAILED DESCRIPTION OF THE INVENTION

First Embodiment, FIGS. 5-10

Figure 1:
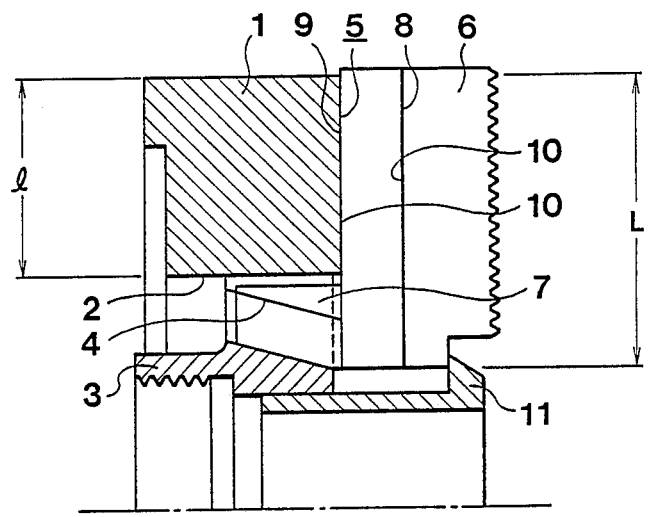
FIG. 1 is a longitudinal sectional view of a prior art chuck illustrating the major component parts thereof.
Figure 2:
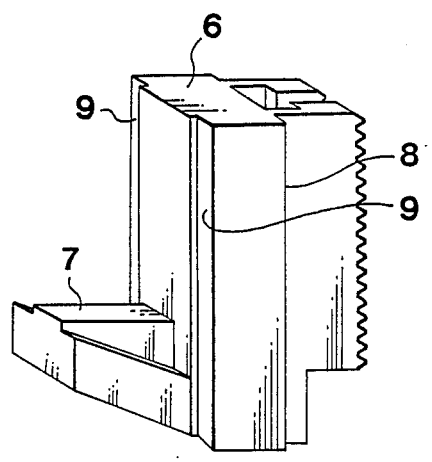
FIG. 2 is a perspective view of a master jaw thereof.
Figure 3:
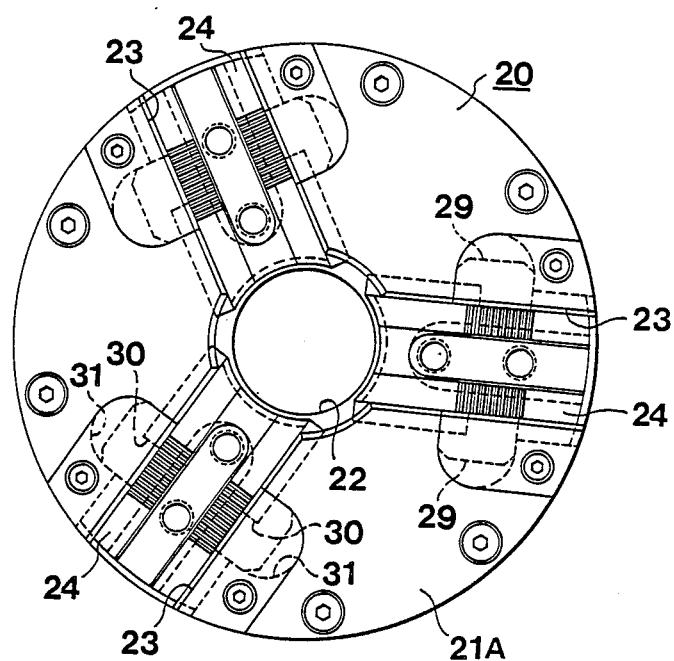
FIG. 3 is a right side view of another prior art chuck.
Figure 4:
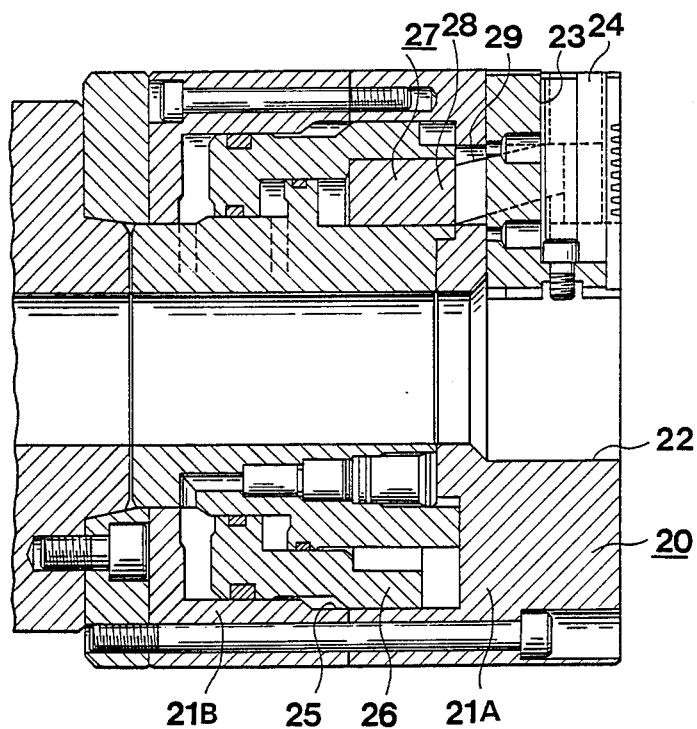
FIG. 4 is a longitudinal sectional view thereof.
Figure 5:
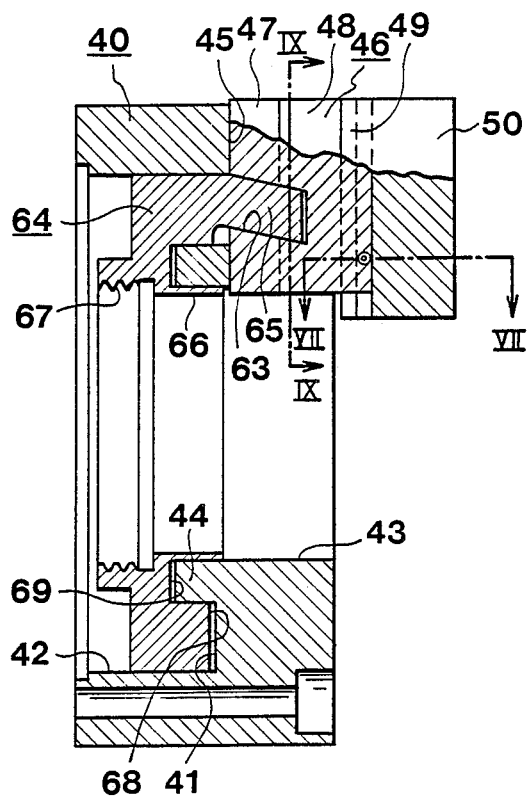
FIG. 5 is a longitudinal sectional view of a first embodiment of a precision chuck in accordance with the present invention.

FIG. 5 shows a first embodiment of a precision chuck in accordance with the present invention and the body 40 of the precision chuck is formed with an enlarged diameter hole 42 and a reduced-diameter hole 43 communicated with each other through an annular step portion 41 formed at the midpoints between the axial ends of the body 40. A cylindrical projection 44 whose inner peripheral surface is in coplanar relationship with the inner peripheral surface of the reduced-diameter hole 43 is extended in the direction of the enlarged-diameter hole 42. The body 40 is formed with a plurality of radially extended guide grooves 45 into each of which is axially slidably fitted a master jaw 46.

Figure 6:
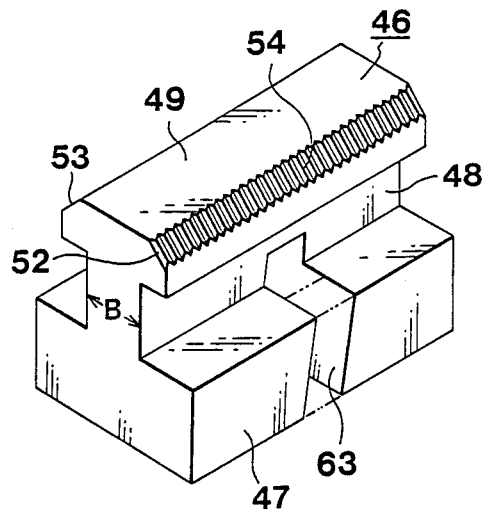
FIG. 6 is a perspective view, on enlarged scale, of a master jaw thereof.
Figure 7:
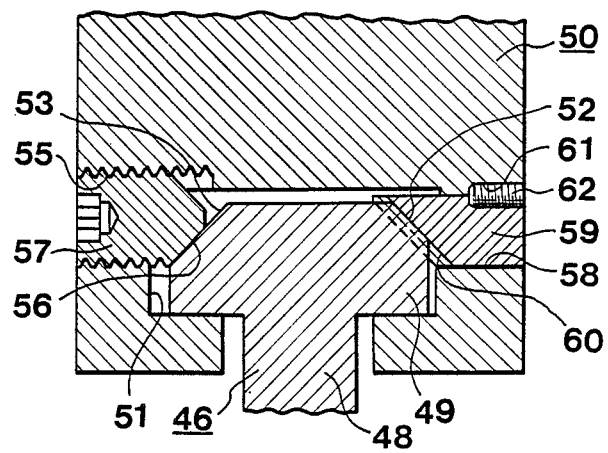
FIG. 7 is a sectional view, on enlarged scale, taken along the line VII—VII of FIG. 5.

As best shown in FIG. 6, the master jaw 46 comprises a plate portion 47 adapted to be fitted into the rear portion of the corresponding guide groove 45 of the body 40, a narrow portion 48 which is formed integral with the front surface and along the widthwise centerline of the plate member 47 and whose width is narrower than that of the plate member 47 and a connecting portion 49 formed integral with the front surface of the narrow portion 48 and adapted to be connected to a top jaw 50 as shown in FIG. 7. The connecting portion 49 is wider than the narrow portion 48. The top jaw 50 is a means adapted to directly hold a workpiece and, as shown in FIG. 7, is formed with a T-shaped groove 51 adapted to embrace the connecting portion 49 of the master jaw 46. Meanwhile the radially extended side edges of the top or front surface of the connecting portion 49 of the master jaw 46 are tapered to define tapered surfaces 52 and 53 and one of the tapered surfaces 52 is serrated (the reference numeral 54). The top jaw 50 is formed with an internally threaded hole 55 in opposed direction with the other tapered surface 53 of the connecting portion 49 of the master jaw 46 fitted into the T-shaped groove 51 and an anchor bolt 57 having a leading end formed into the form of a cone adapted to be pressed against the other tapered surface 53 is threaded into the hole 55. The top jaw 50 is formed with an opening 58 whose inner end is in opposed relationship with the serrated tapered surface 52 of the connecting portion 49 of the master jaw 46 and a key 59 having a serrated inner end adapted to engage with the serrated tapered surface 52 of the connecting portion 49 of the master jaw 46 is fitted into the opening 58 and is securely held in position by means of a setscrew 62 threaded into a tapped hole 61 drilled at the boundary between the top jaw 50 and the key 59.

Figure 8:
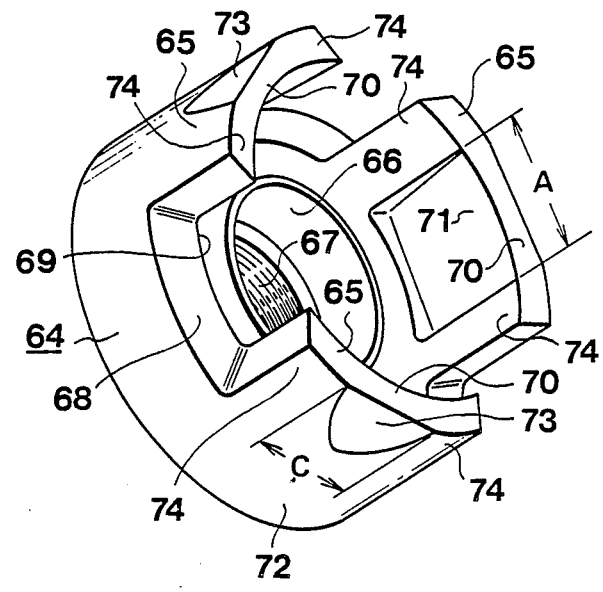
FIG. 8 is a perspective view of a plunger of the first embodiment shown in FIG. 5.

Referring back to FIGS. 5 and 6, the center portion between the ends in the radial direction of the body 40 is formed with a wedge groove 63 which is extended from the rear end surface of the plate portion 47 of the master jaw 46 to the midpoint between the ends in the longitudinal direction of the narrow portion 48 and which is inclined at an angle in relation with the axial direction. As best shown in FIG. 8, a plunger 64 having a plurality of wedge-shaped projections 65 adapted to fit into respective wedge grooves 63 of the master jaw 46 is in the form of a cylinder whose outer diameter is substantially equal to the inner diameter of the enlarge-diameter hole 42 of the body 40 and is formed with a through hole 66 whose rear portion is internally threaded a indicated by 67 for engagement with a draw bar (not shown). The front end surface 68 of the plunger 64 is formed with an annular groove 69 into which is fitted the projection 44 of the body 40 so that the plunger 64 is guided by the inner peripheral surface of the enlarged-diameter hole 42 of the body 40 and the projection 44 thereof to slide through the enlarged-diameter hole 42 in the axial direction thereof.

Figure 9:
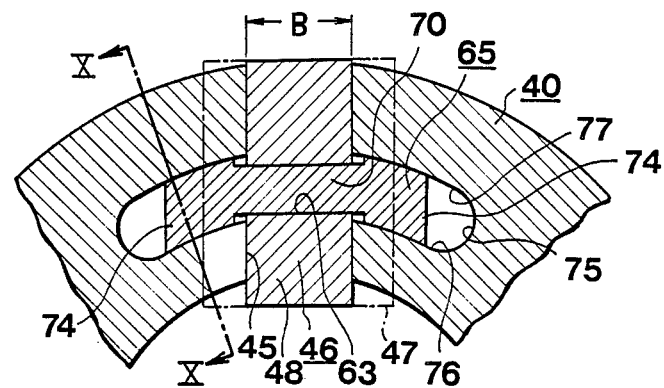
FIG. 9 is a sectional view, on enlarged scale, taken along the line IX—IX of FIG. 5.
Figure 10:
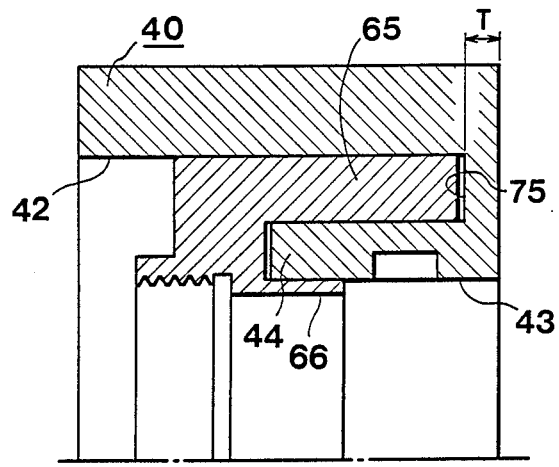
FIG. 10 is a sectional view taken along the line X—X of FIG. 9.

The wedge-shaped projections 65 are extended axially from the outer periphery of the front end surface 68 of the plunger 64 and are angularly spaced apart from each other by 120°. A wedge main body 70 is defined at the midportion between the circumferential ends of the wedge-shaped projection 65 and its inner surface 71 is gradually tapered toward the axis of the plunger 64 as it is extended forwardly so that, as shown in FIGS. 5, 9 and 10, the wedge main body 70 is fitted into the wedge groove 63 of the master jaw 46. The outer peripheral surface 72 of the plunger 64 is tapered so as to define a outer surface 73 which is in parallel with the inner peripheral surface 71. The width A (See FIG. 8) of the inner peripheral surface 71 of the wedge main body 70 is selected to be equal to the width B (See FIG. 6) of the narrow portion 48 of the master jaw 46 plus a minimum tolerance or gap to permit the movement relative to the narrow portion 48 of the master jaw 46. The width C (See FIG. 8) of the tapered outer peripheral surface 73 of the wedge main body 70 is defined to be narrower than the width of the narrow portion 48 of the master jaw 46.

Circumferentially curved reinforcing portions 74 are formed integral with both the circumferential ends of the wedge main body 70 and, as best shown in FIG. 8, the thickness of the reinforcing portions 74 is greater than the thickness of the wedge main body 70. Meanwhile, as best shown in FIG. 9, in the body 40 a sliding hole 75 having arcuate ends is extended from both the circumferential ends of guide groove 45 and communicated therewith. As best shown in FIG. 10, the sliding hole 75 is a blind hole whose bottom is spaced apart by T from the front portion of the body 40. The reinforcing portion 74 of the wedge-shaped projection 65 is relatively intimately fitted for slidable movement therethrough.

Next the mode of operation of the first embodiment with the above-described construction will be explained in detail below.

First the relative position in the radial direction of the body 40 between the top jaw 50 and the plunger 64 must be determined depending upon whether the outer peripheral surface or the inner peripheral surface of a workpiece is held and depending upon the outer or inner diameter of a workpiece to be held. To this end, the anchor bolt 57 is loosened to permit the movement to the right or left in FIG. 7 of the top jaw 50, thereby releasing the serrated tapered surface 52 of the master jaw 46 from the serrated surface 60 of the key 59. Thereafter the top jaw 50 is moved to a position at which it is perpendicular to FIG. 7 and then the anchor bolt 57 is tightened, thereby securely holding the top jaw 50 in position.

In order to hold the outer periphery of a workpiece, as shown in FIG. 5, the plunger 64 is moved to the left in FIG. 5 so that each master jaw 46 is forced to move radially inwardly of the body 40 due to a wedge action between the wedge main body 70 of the wedge-like projection 65 of the plunger 64 and the wedge groove 63 of the master jaw 46. As a result, the outer periphery of a workpiece can be securely held in position by the top jaw 50 connected to the master jaw 46. When the plunger 64 is moved to the right in FIG. 5, the master jaw 46 are forced radially outwardly, whereby the inner peripheral surface of a workpiece is held. In the latter case, the guide surface or the inner peripheral surface 76 of the sliding hole 75 of the body 40 supports the inner peripheral surface of the reinforcing portion 74 of the wedge-shaped projection 65 of the plunger 64 so that even when the external machining force applied to a workpiece is gradually increased and consequently an excessive load is exerted to the reinforcing portion 74, the inner peripheral surface 76 of the sliding hole 75 of the body 40 functions as a bearing surface for receiving part of the load to such an extent that the deformation of the reinforcing portion 74 is almost negligible. On the other hand, in case of holding the outer peripheral surface of a workpiece, the guide surface or the outer peripheral surface 77 of the arcuate groove 75 of the body 40 functions as a bearing surface supporting the outer peripheral surface of the reinforcing portion 74 of the wedge-shaped projection 65 so that the latter can be securely supported in a stable manner.

According to the first embodiment described above, the wedge-shaped projection 65 of the plunger 64 can be securely held in a stable manner during a machining operation due to the bearing surface function between the wedge-shaped projection 65 and the inner or outer peripheral surface 76 or 77 of the body 40 so that no great deformation results as in the cases of the prior art chucks. Therefore the fundamental inventive concept of the first embodiment of the present invention for securely holding a workpiece with a higher degree of accuracy is apparently different from that of the prior art chucks for preventing breakdown or rupture of their component parts. In addition, according to the first embodiment of the present invention, the bearing surfaces are defined so that the wedge-shaped projection 65 can be extended longer and the stroke of the master jaw 46 can be increased. Furthermore, the master jaw 46 is not needed to be provided with a conventionally used T nut so that the axial length of the master jaw 46 is not increased as compared with the prior art chucks. As a result, the master jaw 46 can be made light in weight and can be rotated in a high rotational velocity range.

So far it has been described that the master jaw 46 and the top jaw 50 are provided independently of each other, but it is to be understood that they can be made into a unitary construction. Moreover, when the wedge-shaped projection 65 of the plunger 64 is extended beyond the width B of the narrow portion 48 of the master jaw 46, it is supported by the inner or outer peripheral surface 76 or 77 of the arcuate groove 75 of the body 40 so that the width of the wedge-shaped projection 65 is suitably selected, it becomes possible to close the sides of the wedge groove 63 of the plate portion 47 as indicated by the imaginary lines in FIG. 6. In addition, the body 40 is a unitary structure so that it can be fabricated by a single machining means and a single machining step. Furthermore, since the shapes of the component parts are simple, it may be so designed and constructed that the inner and outer peripheral surfaces 76 and 77 of the sliding hole 75 of the body 40 can be simultaneously made into contact with the inner and outer peripheral surfaces of the reinforcing portion 74 of the wedge-shaped projection 65.

As a result, the holding of the outer peripheral surface of a workpiece is immediately changed to the holding of the inner peripheral surface thereof, no deformation results and a high degree of workpiece-holding-accuracy can be ensured.

Furthermore, it is preferable that the whole master jaw 46 is always located in the radial guide groove 45 of the body 40 so that in case of holding a workpiece, deformations can be reduced to a minimum and the workpiece-holding-accuracy can be further improved. Moreover, it is possible to define the wedge groove 63 of the master jaw 46 along one side thereof instead of extending the wedge groove 63 over the whole width of the master jaw 46.

Second Embodiment, FIGS. 11-15

Figure 11:
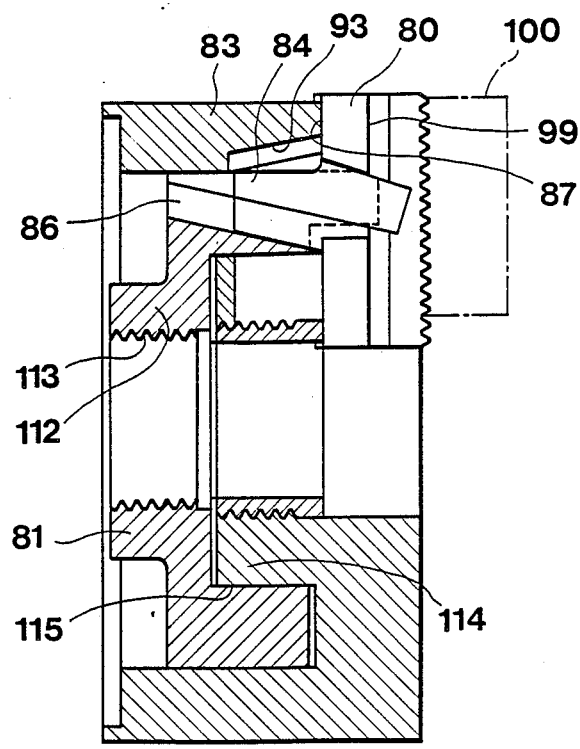
FIG. 11 is a longitudinal sectional view of a second embodiment of the present invention illustrating the major component parts thereof.
Figure 12:
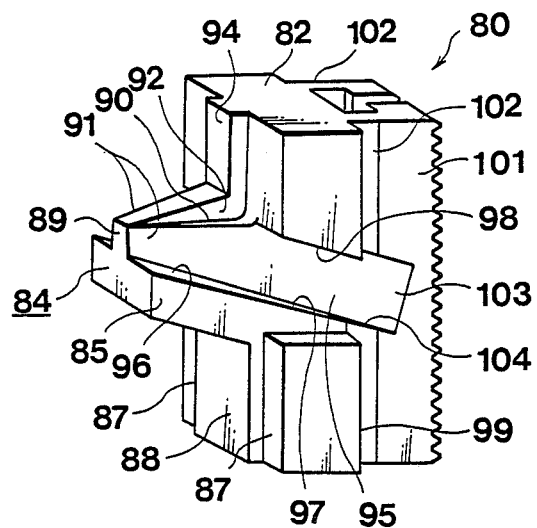
FIG. 12 is a perspective view of a master jaw thereof.
Figure 13:
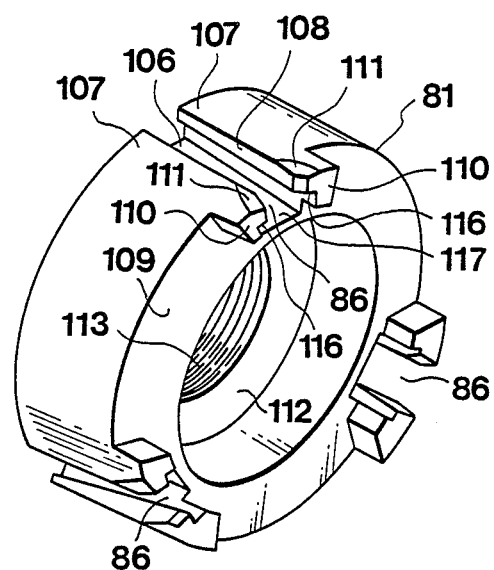
FIG. 13 is a perspective view of a plunger thereof.

FIG. 11 is a second embodiment of a precision chuck in accordance with the present invention. FIG. 12 shows in detail a master ja 80 thereof while FIG. 13 shows in detail a plunger 81 thereof.

Referring first to FIG. 12, the master jaw 80 has a main body 82 substantially in the form of a parallelpiped and a T-shaped wedge 84 is extended from the rear surface of the main body 82 from the midpoint between the ends in the radial direction of the main body 82; that is, from a position adjacent to a turning point at which no floating occurs. A wide action portion 85 which is an integral lower portion of the T-shaped edge 84 and which is extended in a tangential direction of the master jaw 80 coacts with a T-shaped wedge groove 86 of the plunger 81 to cause a wedge action. It is inclined upwardly at an angle from the rear surface. Rear guided surfaces 87 are defined along both the shorter sides of the main body 82 so that the width of the acting portion 85 is smaller than the width between the shorter sides of the main body 82. A thick or raised portion 88 whose width is equal to that of the acting portion 85 is defined over the rear surface below the acting portion 85.

An upright reinforcing portion 89 having a flat top surface 90 perpendicular to the main body 82 is defined along the centerline in the widthwise direction of the acting portion 85. Sliding surfaces 91 for guiding the plunger 81 (See FIG. 13) are partially defined on both the side surfaces of the reinforcing portion 89. The sliding surfaces 91 are inclined toward the axial direction of the body 83 in such a way that the width between the sliding surfaces 91 is gradually narrowed toward the leading end (the rear portion of the body 83) of the reinforcing portion 89 which has a sharp end. A second reinforcing portion 92 having an inclined surface whose base portion is higher than the top surface 90 of the reinforcing portion 89 is defined on the top surface thereof and is adapted to fit into a slot groove 93 (FIG. 11) of the body 83. A thick or raised portion 94 whose width is equal to that the second reinforcing portion 92 is defined upwardly on the rear surface from the rear end of the second reinforcing portion 92.

On both sides of the main body 82 sliding surfaces 95 which are in coplanar relationship with the sliding surfaces 91, respectively, are formed integral with the sliding surfaces 91 and the front guided surface 99 is cut to define cutout portions 98 which in turn define extended surfaces 97 which are in coplanar relationship with the upper surfaces 96 and in contiguous therewith. Side guided surfaces 102 on both sides of the joint 101 between the main body 82 and a top jaw 100 (See FIG. 11) extended forwardly of the main body 82 are formed with recesses 104 which in turn define sliding surfaces 103 which are in coplanar relationship with the sliding surfaces 95, respectively, and in contiguous therewith.

The side guided surface 102 is defined only at the rear portion of the joint 101 and is supported by the guide surface (not shown) of a radial guide groove of the body 83 and the front portion of the joint 101 is so defined as not to make contact with the guide surface of the radial guide groove.

As best shown in FIG. 13, the plunger generally indicated by the reference numeral 81 is formed with a T-shaped groove 86 adapted for engagement with the T-shaped wedge 84 of the master jaw 80. The T-shaped wedge groove 86 has an inclined groove main body 106 along which slide the upper surfaces 96 and the lower surfaces 105 of the acting portion 85 of the T-shaped wedge 84 of the master jaw 80. Overhanging portion 107 are extended from both the outer peripheral sides of the groove main body 106 and a narrow groove 108 into which is fitted the reinforcing portion 89 of the T-shaped wedge 84 of the master jaw 80 is defined between the opposing overhanging portions 107 and is communicated with the groove main body 106. Projections 110 are extended from the front end face 109 of the plunger 81 in such a way that when the acting portion 85 of the T-shaped wedge 84 of the master jaw 80 is fitted into the groove main body 106, the projections 110 are in opposed relationship with the sliding surfaces 95 of the notches 98 of the master jaw 80 or the sliding surfaces 103 of the joint 101. The corners at the leading ends of the outer peripheral portions of the projections 110 are tapered to define tapered surfaces 111, respectively. A boss 112 having an internally threaded screw 113 for threadable engagement with a draw bar (not shown) in attached to the plunger 81.

In case of the machining operation of a workpiece whose outer peripheral surface is gripped, forces act on the upper surfaces 96 and the extended surfaces 97 of the T-shaped wedge 84 of the master jaw 80 so that a bending moment is exerted to each of the overhanding portions 107, but the outer periphery of the overhanding portion 107 is defined with an outer bearing surface in such a manner that the inner surface of the center bore 79 of the body 83 is made into contact with the outer peripheral surface of the plunger 81, thereby supporting the plunger 81 so that a workpiece held by the precision chuck can be machined with a high degree of dimensional accuracy. In case of machining a workpiece whose inner peripheral surface is held, a force acts on the lower surface 105 of the T-shaped wedge 84 of the master jaw 80 so that a bending moment is exerted to the bottom of the T-shaped wedge groove 86 of the plunger 81, but the inner periphery of the bottom wall of the T-shaped wedge groove 86 has an inner peripheral bearing surface in such a way that the outer peripheral surface 115 of the cylinder 114 projected from the center of the body 83 is made into contact with the inner peripheral surface of the plunger 81, thereby supporting the plunger 81 so that a workpiece can be machined with a high degree of accuracy.

Next the mode of operation of the second embodiment with the above-described construction will be explained in detail below.

Referring back to FIG. 11, when the plunger 81 is displaced to the left, due to the wedging action between the upper surfaces 116 and the lower surface 117 of the T-shaped wedge groove 86 of the plunger 81 and the opposing sliding surfaces 96 and 105 of the T-shaped wedge 84 of the master jaw 80, the front guided surfaces 99, the rear guided surfaces 87 and the side guided surfaces 102 of each master jaw 80 slide over the mating sliding surfaces of the body 83 in the radially inward direction so that the outer peripheral surface of a workpiece can be securely held by the top jaw 100 connected to the master jaw 80. On the other side, when the plunger 81 is shifted to the right in FIG. 11, the master jaw 80 are forced to move radially outwardly of the body 83 so that the inner peripheral surface of a workpiece can be securely held.

As is apparent from FIG. 11, when the plunger 81 is moved to its rightmost position, the projections 110 of the plunger 81 extend through the notches 98 of the master jaw 80 so that the leading ends of the projections 110 are in opposed relationship with the sliding surfaces 103, respectively, of the joint 101. As a result, even when the extended length of the T-shaped wedge 84 is considerably shortened as compared with the prior art chucks, the holding stroke of the master jaw 80 is substantially similar to that of the prior art chuck. As a consequence, the body 83 can be remarkably reduced in thickness and therefore the T-shaped wedge 84 of the master jaw 80 can be made light in weight. Moreover, since the notches 98 are formed, the weight of the main body 82 can be decreased accordingly. Furthermore, the sliding surfaces 91, 95 and 103 on both sides are reduced in width as they extend toward the front portion of the master jaw 80 so that their weights are decreased. As a result, the overall weight of the body 83 and the master jaw 80 is significantly reduced as compared with the prior art chucks so that even when the precision chuck of the present invention is rotated at high rotational velocities, the resulting centrifugal force becomes less. Thus the present invention can provides a precision chuck best adapted to be rotated at high velocities.

Figure 14:
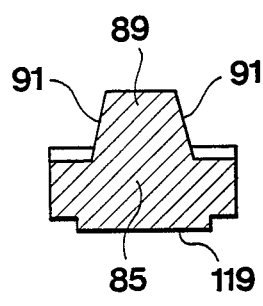
FIG. 14 is a longitudinal sectional view of a modification of a T-shaped wedge portion.
Figure 15:
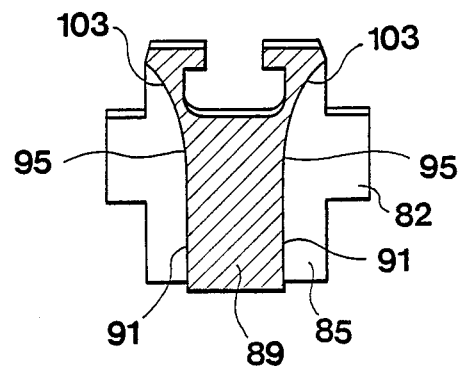
FIG. 15 is a cross sectional view illustrating a modification of a master jaw.

As shown in FIG. 14, a plate-like projection 119 is extended from the lower surface of the acting portion 85 of the T-shaped wedge 84 beyond the outer sides of the reinforcing portion 89 so that the acting portion 85 can be further reinforced. Furthermore, as shown in FIG. 15, the sliding surfaces 91 of the reinforcing portion 89 of the T-shaped edge 84 may be made in parallel with each other and ma be merged with the outwardly arcuate sliding surfaces 95 and 103 of the main body 82 and the joint 101.

Figure 16:
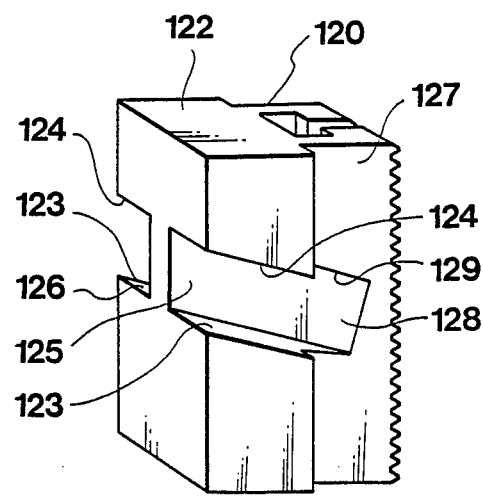
FIG. 16 is a perspective view of a master jaw of a third embodiment of the present invention.
Figure 17:
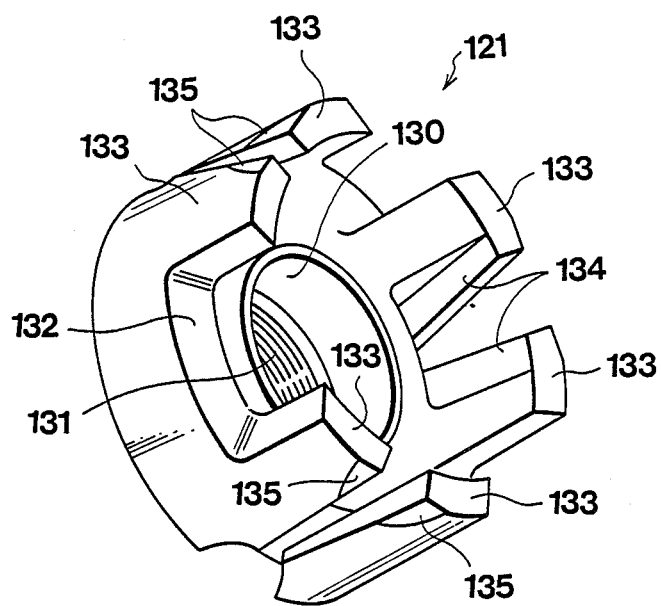
FIG. 17 is a perspective view of a plunger for engagement with the master jaw shown in FIG. 16.

Third Embodiment, FIGS. 16 and 17

FIGS. 16 and 17 show a master jaw 120 and a plunger 121 of a third embodiment of a precision chuck in accordance with the present invention. Unlike the second embodiment described above, the master jaw 120 is not provided with a T-shaped wedge 84 and, instead, the main body 122 is formed with wedge grooves 123 in both the side surfaces thereof which are inclined downwardly toward a top jaw. Each wedge groove 123 is defined by a flat upper surface 124, a flat guide surface 125 and a flat lower surface 126. The guide or sliding surfaces 125 of the wedge grooves 123 are gradually converged toward the front portion of the master jaw 120. In other words, the thickness between the guide or sliding surfaces 125 are gradually decreased toward the front portion of the master jaw 120. Recesses 129 are formed in both the side surfaces of a joint 127 which is connected to a top jaw (not shown). The recesses 129 define sliding surfaces 128 which are in coplanar relationship with the sliding surfaces 125 and in contiguous therewith.

FIG. 17 shows the plunger 121 which coacts with the master jaw 120 with the above-described construction so as to cause a wedge action. The plunger 121 is in the form of a cylinder whose outer diameter is substantially equal to the inner diameter of the center bore of the body and a boss 130 having an internally threaded screw 131 for threadable engagement with a draw bar (not shown) is fitted into the hole of the plunger 121. Three wedges 133 which are adapted to engage with the front end surface 132 of the plunger 121 and the wedge grooves 123 of the master jaw 120, respectively, are extended and equiangularly spaced apart from each other in the circumferential direction. Each wedge 133 has such a width that when it is fitted in the corresponding wedge groove 123, the wedge 133 extends beyond the side surface of the master jaw 120. The portion of the wedge 133 which is fitted into the wedge groove 123 is a thin wall portion 134 which is formed by cutting the rear surface of the wedge 133 and a tapered surface 135 is formed at one corner of the outer peripheral surface of the leading end of the wedge 133.

When the plunger 121 is moved in the axial direction, the wedges 133 of the plunger 121 engage with the wedge grooves 123, respectively, so that the master jaw 120 is forced to move in the radial direction.

As described above, the third embodiment is not provided with the T-shaped wedge portion so that the axial length of the master jaw 120 can be shortened. Furthermore, the body can be made thin and compact in size and can have a longer stroke. In addition, the master jaw can be made light in weight so that it can be rotated at high rotational velocities.

Fourth Embodiment, FIGS. 18-23

A fourth embodiment of a precision chuck in accordance with the present invention as shown in FIGS. 18-23 uses the master jaw of the type described above with reference to FIG. 16.

Figure 18:
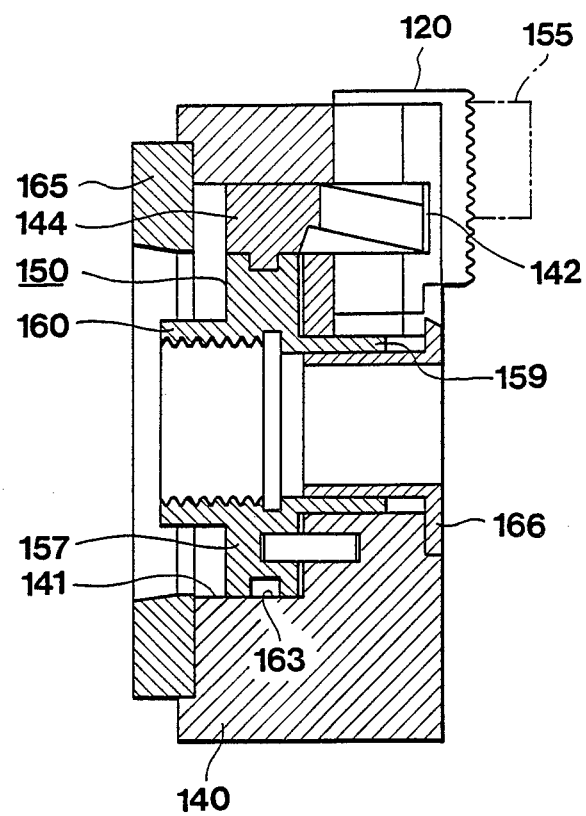
FIG. 18 is a longitudinal sectional view of a fourth embodiment of the present invention illustrating the major component parts thereof.

Referring first to FIG. 18 illustrating the major component parts of the fourth embodiment, a body 140 is formed with an inner sliding surface 141 which is coaxial with the axis of the body 140 and a plurality of equiangularly spaced apart sliding holes 142 are drilled radially outwardly of the inner sliding surface 141. The front end surface of the body 140 is formed with a plurality of guide grooves 143 each having a T-shaped cross sectional configuration as best shown in FIG. 19 in such a manner that the front side of each guide groove 143 is opened.

Figure 20:
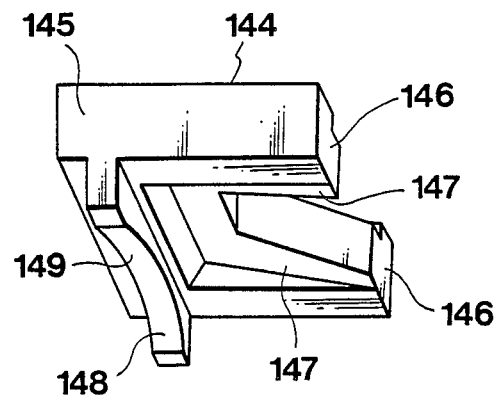
FIG. 20 is a perspective view of a wedge of the fourth embodiment shown in FIG. 18.

As best shown in FIG. 20, a wedge 144 inserted into each sliding hole 142 is in the form of a fork end in which a pair of wedge main bodies 146 which are perpendicular the lengthwise direction of a base portion 145 are extended in parallel with each other from both the ends of the base portion 140 and wedge portions 147 rectangular in cross section are defined on the opposing inner surfaces of the wedge main bodies 146 in such a way that they are inclined downwardly from the base to the leading end thereof and that the spacing between the wedge portions 147 is gradually decreased from the leading ends toward the bases thereof. Each of the wedge main bodies 146 has a rectangular cross sectional configuration and its upper and lower surfaces are supported by the sliding hole 142. An engaging projection 148 is extended from the lower surface of the wedge 144 in the lengthwise direction thereof and the lower surface 149 of the engaging projection 148 is inwardly arcuated in such a manner that the midpoint between the ends of the arcuate surface 149 is higher than the ends of the arcuate surface 149. The engaging projection 148 has a function of transmitting the sliding displacement force from a draw bar (not shown) through a piston 150 to the wedge 144.

Figure 19:
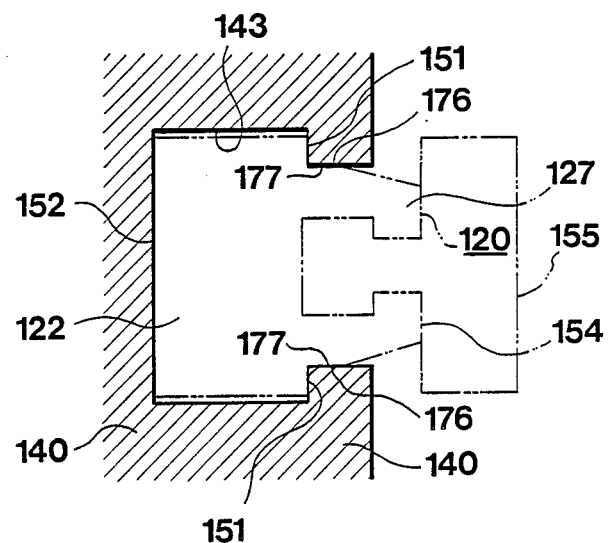
FIG. 19 is a sectional view of a guide groove of the body shown in FIG. 18.
Figure 21:
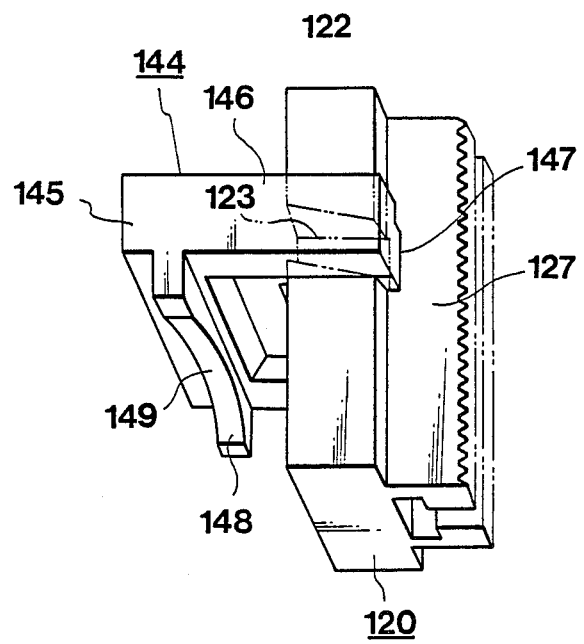
FIG. 21 is a perspective view illustrating the engagement between the wedge and the master jaw.

The master jaw 120 is inserted into a guide groove 143 of a body 140 as shown in FIGS. 18 and 19 and is adapted to open or close by the slidable displacement in the radial direction of the body 140. The detailed construction of the master jaw 120 has been already described with reference to FIG. 16 and, as best shown in FIG. 21, each wedge main body 146 of the body 140 is inserted into the corresponding wedge groov 123 of the master jaw 120. The master jaw 120 has a T-shaped cross sectional configuration and serves as a guided inner surface when the front guided surfaces 151 and the rear guided surface 152 of the main body 122 are fitted into the guide groove 143 of the body 140 and are displaced in the radial direction of the body 140. Both the side surfaces 176 of the narrow joint 127 are used as guided surfaces and the front end portion of the joint 127 is extended outwardly of the body 140, whereby a front serrated surface 154 engages securely with a top jaw 155. The narrow joint 127 of the master jaw 120 as shown in FIG. 19 is defined with one portion of which both side surfaces are parallel and another portion of which both side surfaces are reduced in width as they extend toward the front portion. The narrow joint 127 is supported by the guide surfaces 177 of the front open portion of the body 140 with the parallel surfaces only acting as guided surfaces.

The master jaw 120 is made into engagement with the wedge 144 as shown in FIG. 18.

Figure 22:
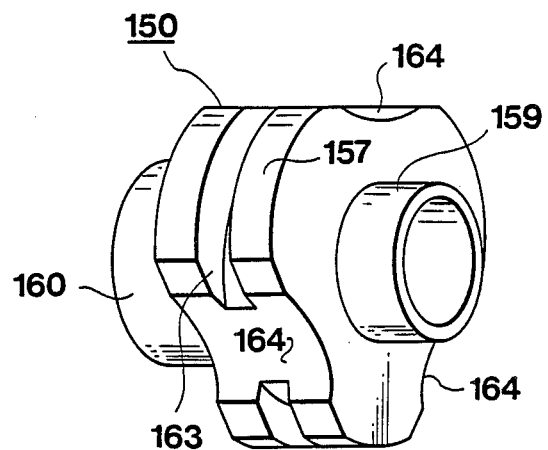
FIG. 22 is a perspective view of a piston of the fourth embodiment shown in FIG. 18.
Figure 23:
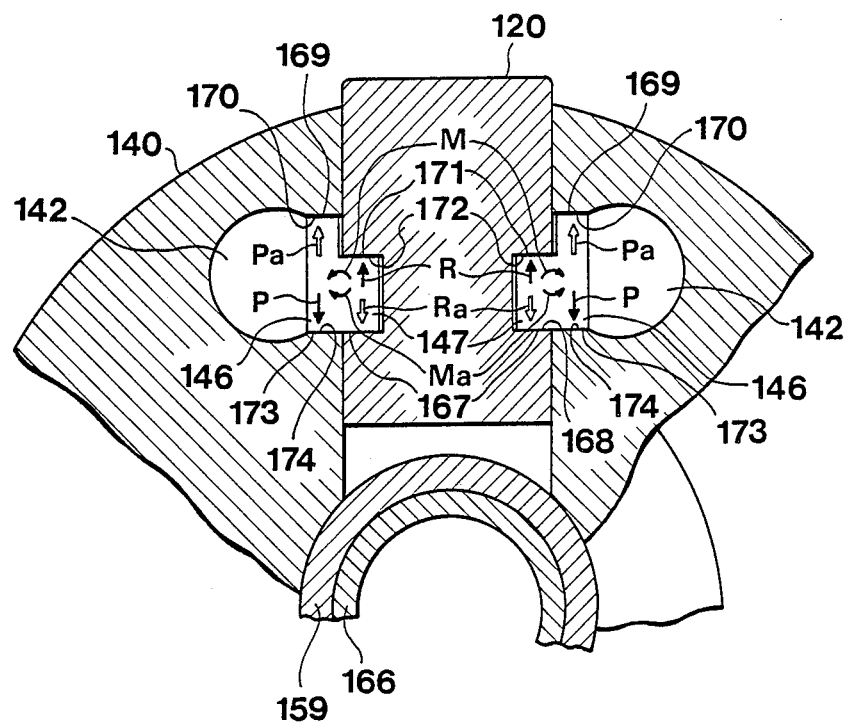
FIG. 23 is a longitudinal sectional view of the fourth embodiment shown in FIG. 18 used to explain the forces acting on the wedges.

As best shown in FIG. 22, the piston 150 has a cylindrical sliding portion 157 which can be slidably fitted into the enlarged-diameter center bore 156 of the body 140 and an annular projection 159 adapted to be fitted into the reduced-diameter center bore 158 of the body 140 is extended from the leading end of the sliding portion 157. A boss 160 is extended backwardly of the sliding portion 157 and has a internally threaded screw 161 for threadable engagement with a draw bar (not shown).

A circumferential engaging groove 163 into which is relatively intimately fitted the engaging projection 148 of the wedge 144 is formed in the outer peripheral surface 162 of the sliding portion 157 at the midpoint between the axial ends thereof. Furthermore the outer peripheral surface 162 of the sliding portion 157 is formed with three arcuate recesses 164 which are equiangularly spaced apart from each other by 120°. These arcuate recesses 164 are provided in order to make the piston 150 into engagement with each wedge 144 incorporated into the body 140. That is, after the wedges 144 are incorporated into the body 140, the piston 150 is inserted into the enlarged-diameter center bore 156 of the body 140 in such a way that the arcuate recesses 164 are in opposed relationship with respective engaging projections 148 of the wedges. After the piston 150 is completely inserted into the enlarged-diameter center bore 156 of the body 140 in the manner described above, the piston 150 is rotated through 60° so that the engaging projections 148 of the wedges 144 are made into engagement with respective engaging grooves 163, whereby the piston 150 can be made into engagement with each wedge 144. Of course it is possible to remove an adapter 165 which is joined to the rear end of the enlarged-diameter center bore 156 of the body 140 for mounting the body 140 on a spindle (not shown) and to incorporate each wedge 144 joined to the piston 150 into the body 140. A cover 166 is fitted into the reduced-diameter center bore 158 and made into slidable contact with the inner peripheral surface of the annular projection 159 of the piston 150.

Next the mode of operation of the fourth embodiment with the above-described construction will be explained in detail below.

When the piston 150 is pulled to the left in FIG. 18 by means of a draw bar (not shown), the pulling force is transmitted through the engaging groove 163 and the engaging projection 148 to each wedge 144 so that a pair of wedge main bodies 146 on both sides of the wedge 144 are guided by the sliding holes 142 and are displaced to the left. As a result, the top jaw 155 securely joined to the master jaw 120 can firmly hold the outer peripheral surface of a workpiece.

In case of machining a workpiece held by the precision chuck in accordance with the present invention, the sliding surfaces 167 of the wedge portions 147 force the sliding surfaces 168 of the wedge grooves 123 of the master jaw 120 radially inwardly, but in this case, the sliding surfaces 169 of the wedge main bodies 146 supporting the wedge portions 147 are supported by the sliding surfaces 170 of the sliding hole 142 of the body 140, whereby an outer peripheral bearing surface is defined. From the standpoint of dynamics, the force R for causing the displacement of the wedge portion 147 produced by the pulling force of the piston 150 is exerted in the opened direction of the master jaw 120 while the reaction force P having the same magnitude and acting in the opposite direction is received by the wedge main body 146. In other words, the wedge main bodies 146 are subjected to the moment M, tending to rotate, but this rotation is effectively prevented by the base portion 145 integral with the wedge main bodies 146.

Therefore the sliding surfaces 169 of the wedge main bodies 146 are received by the sliding surfaces 170 of the sliding holes 142 and the wedge main bodies 146 which are prevented from being displaced even when they are subjected to the torsional moment M can receive the force tending to cause the master jaw 120 to open as shearing stresses.

On the other hand, when the piston 150 is pushed to the right in FIG. 18, the pushing force is transmitted through the engaging groove 163 and the engaging projection 148 to each wedge 144 as described above so that the wedge main bodies 146 on both sides of the wedge 144 are guided by the sliding hole 142 to be displaced to the right. More particularly, the sliding surfaces 171 of the wedge portions 147 of the wedge main bodies 146 slide over the sliding surfaces 172 of the wedge grooves 123 of the master jaw 120, whereby they are displaced relative to each other so that the master jaw 120 forced radially outwardly due to a wedge action. Therefore the top jaw 155 securely joined to the master jaw 120 can grip the inner peripheral surface of a workpiece.

In case of machining a workpiece whose inner peripheral surface is securely gripped by the precision chuck in accordance with the present invention, the sliding surfaces 171 of the wedge portions 147 press radially outwardly the sliding surfaces 172 of the wedge grooves 123 of the master jaw 120, but the sliding surfaces 173 of the wedge main bodies 146 are supported by the sliding surfaces 174 of the sliding hole 142 of the body 140, whereby an inner peripheral bearing surface is defined. From the standpoint of dynamics, the force Ra which is produced by the pulling force of the piston 150 and which causes the wedge portion 147 to displace itself is exerted in the direction in which the master jaw 120 is closed while the reaction force Pa having the same magnitude and acting in the opposite direction is received by the wedge main body 146. In other words, the wedge main bodies 146 are subjected to the torsional moment Ma so that they tend to rotate, but their rotation is effectively prevented by the base portion 145 formed integral with the wedge main bodies 146.

Thus, as in the case of the torsional moment M, even when the wedge main bodies 146 are subjected to the torsional moments Ma, they can receive as shearing stresses the force tending to close the master jaw 120.

Therefore the deflection of the wedge main body 146 due to the shearing stresses acting thereon occurs only in the spacing between the master jaw 120 and the body 140. It follows therefore when the wedge main body 146 is given a sufficient dynamic rigidity in this spacing, the deflection of the wedge main body 146 can be eliminated completely. When the body 140 supports the wedge 144, it is preferable to use a beam construction which supports a load at both ends thereof so that the load which produces the force causing the master jaw 120 in the radial direction is supported at fulcrum points in the body 140 at both the axial ends of the master jaw 120.

In the fourth embodiment, the piston 150 and the wedge 144 are fabricated as separate component parts. The reason is as follows. The portions of the body 140 in opposed relationships with the arcuate recesses 164 of the piston 150 can be radially inwardly extended and the radially inwardly extended portions can be further extended in the axial direction so as to be joined with the adapted 165. As a result, as compared with the prior art chucks in which the piston and the wedge are formed integral, the body 140 can be increased in rigidity and can be made light in weight.

In case of the wedge 144 in the form of a fork end in which a pair of wedge main bodies 146 are formed integral with the base portion 145 as described above, the torsional moments acting on the two wedge main bodies 146 act on the base portion 145 as a couple so that when the strength of the joints between the base portion 145 and the wedge main bodies 146 is increased to such a degree sufficient to withstand such couple, the high-precision and high holding force hitherto unobtainable by the prior art chucks in which a pair of wedge main bodies and a base portion are not made into a unitary construction can be obtained.

Figure 24:
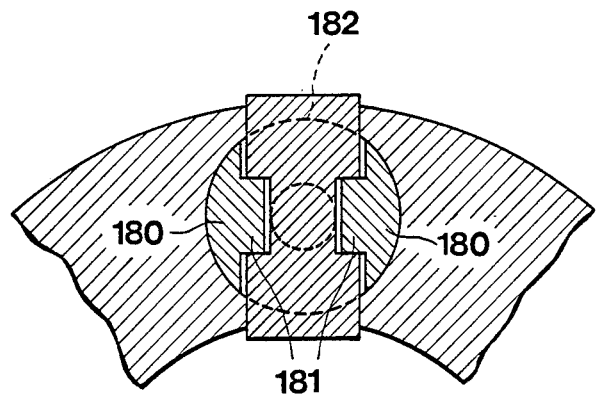
FIGS. 24 and 25 are longitudinal views illustrating modifications of wedges, respectively.
Figure 25:
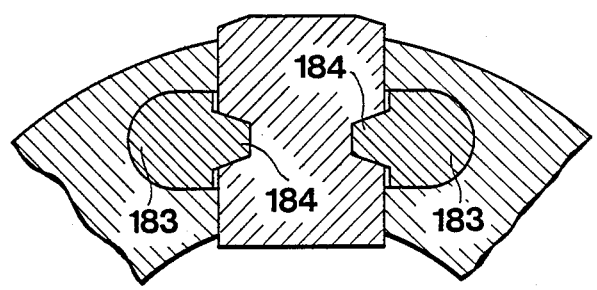

Various modifications of the fork-end-shaped wedge main body 146 which can attain the above-described function and effects, may be considered. For instance, as shown in FIG. 24, wedge main bodies 180 and wedge portions 181 extended therefrom, respectively, can be machined from a cylindrical workpiece 182 indicated by an imaginary line. Furthermore, as shown in FIG. 25, a wedge portion having a trapezoidal cross sectional configuration may be extended from a wedge main body 183 having a semi-elliptical cross sectional configuration.

Figure 26:
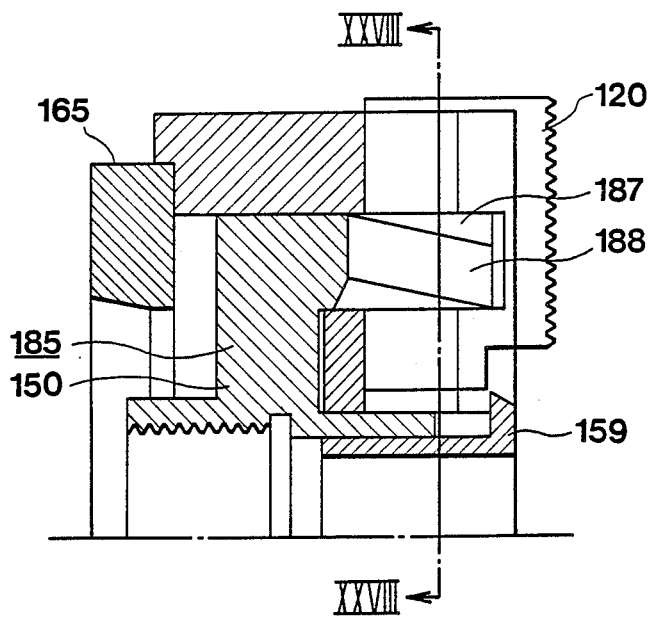
FIG. 26 is a longitudinal sectional view of a fifth embodiment of the present invention illustrating the major component parts thereof.
Figure 27:
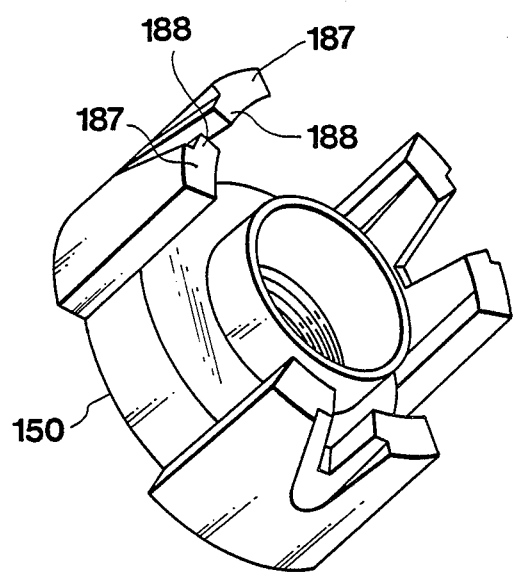
FIG. 27 is a perspective view of a jaw action body thereof.
Figure 28:
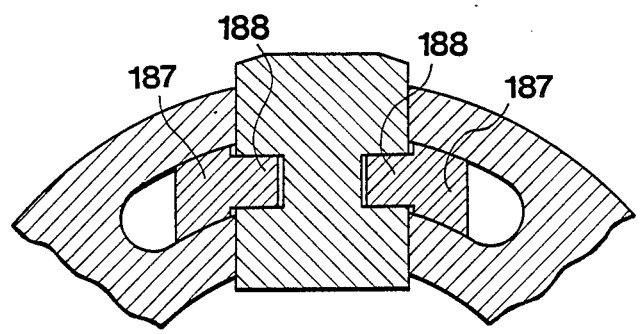
FIG. 28 is a sectional view taken along the line XXVIII—XXVIII of FIG. 26.

Fifth Embodiment, FIGS. 26–28

FIGS. 26–28 shows a fifth embodiment of a precision chuck in accordance with the present invention which is a modification of the fourth embodiment described above. The fifth embodiment is characterized in that the edge 144 and the piston 150 are integrated into a unitary structure, thereby providing a jaw-action body 185. The jaw-action body 185 has a wedge 186 which, as in case of the fourth embodiment, has a pair of opposing wedge main bodies 187 each of which is formed with a wedge portion 188.

Figure 29:
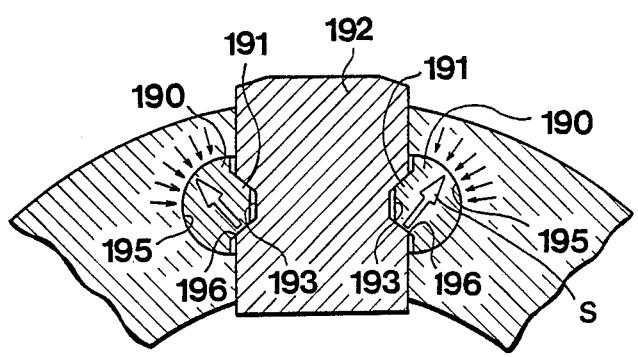
FIG. 29 is a longitudinal sectional view illustrating an optimum embodiment of a fork-end-shaped wedge.

Referring next to FIG. 29, the fitting construction of a wedge main body 190 which can further enhance the effects, features and advantages of the present invention will be described. The wedge main body 190 has a semicircular cross sectional configuration and a wedge portion 191 having an equilateral trapezoidal cross sectional configuration is extended inwardly from the wedge main bod 190. A master jaw 192 is formed with a guide groove 193 which has an equilateral trapezoidal cross sectional configuration and into which is slidably fitted the wedge portion 191. Each of sliding holes 195 of the body 194 has a semi-circular cross sectional configuration so that the wedge main body 190 can be slidably fitted therein.

The above-described construction has an advantage in that when the spacing between the master jaw 192 and the wedge portion 191 is same as that of the fourth embodiment described above, a play in the directions in which the master jaw 192 is opened and closed can be reduced due to the inclined sides of each trapezoid. In addition, the wedge main body 190 semi-circular in cross section is made into intimate contact with the curved wall surface of the sliding hole 195 so that the lateral displacement of the wedge portion 191 can be prevented. Importantly, when the forces in the opening or closing direction of the wedge main bodies 190 are exerted on the wedge portions 191, they act on the pressure receiving surfaces of the guide grooves 193 of the master jaw 192 and the reaction forces from the centers of the pressure receiving surfaces 196 act in the directions indicated by the arrows S and are received by the upper arcuated surfaces of the curved wall surfaces of the sliding holes 195. As a result, the wedge main body 190 has a stronger rigidity to withstand the reaction. In addition, when the reaction force passes through the center of the curved wall surface of the sliding hole 195; that is, when the arrow S passes the center of the curved surface, the reaction force becomes perpendicular to the upper arcuate surface so that no torsional moment acts on the wedge main bodies 190. As a consequence, no couple acts on the base portion of the wedge main body 190.

This suggests that when, instead of the inclined lateral sides of a trapezoid, the wedge main body 190 has a curved surface coaxial with the curved surface of the sliding hole 195, a wedge action can be further enhanced.

In the construction shown in FIG. 29, the wedge portion 191 is extended from the wedge main body 190 and the guide groove 193 is cut into the outer surface of the master jaw 192, but it is understood that the same effects and functions can be attained even when the guide groove 193 is cut into the wedge main body 190 while the wedge portion 191 is extended from the master jaw 192.

What is claimed is:

1. A precision chuck, for holding and rotating a workpiece unitarily with the chuck, adapted to grip said workpiece by applying radially inward and outward force to the workpiece as required without application of bending moments to jaw portions of said chuck, comprising:

a. a chuck body centered on an axis of rotation, having an axial passageway therein adapted to slideably receive an annular plunger, said chuck body having a plurality of equiangularly spaced radial slots with a like plurality of axially extending guide bores opening into said radial slots, said guide bores includng guide surfaces adapted to slideably contact and support respective radially inner and outer load bearing surfaces of jaw activating wedges moved by said plunger over a range of axial displacement of said plunger as said chuck is gripping a workpiece by exerting radial force thereagainst;

b. said plunger being axially slideably resident within said body;

c. a plurality of circumferentially equiangularly spaced generally axially projecting wedge members extending axially to collectively define a fork extending from an annular ring-like base portion of said plunger;

A. each wedge member including a central camming portion of relatively reduced thickness and canted radially inwardly from said plunger base portion;

B. each wedge member further including axially extending reinforcing portions of relatively greater thickness than said canted portion, angularly flanking and integral with said canted portion;

said reinforcing portions and said canted central camming portion defining an I-beam-like wedge suporting beam structure, with said canted central camming portion corresponding to a web of said I-beam, said reinforcing portions of said wedge members slideably engaging said guide surfaces of said chuck body over the range of axial movement of said plunger so that when said body supports said wedge members as said wedges are advanced along said guide surfaces to move jaw member of said chuck against a workpiece, positions of contact at both axial ends of a jaw within said chuck body become fulcrum points;

d. said jaws being radially slideable in respective ones of said radial slots and includng recesses confronting said respective guide bores, said recesses having parallel camming surfaces sloping towards said axis at an angle relative to said axis corresponding to the angle of radial inward cant of said camming portions of said wedge members, each jaw member operatively engaging a camming portion of one of said wedge portions at the axial midpoint of said jaw member in a manner to be radially moveable along said radial slots in said body in response to axial movement of said plunger causing a respective wedge member to engage a respective jaw member.

2. A precision chuck, for holding and rotating a workpiece unitarily with the chuck, adapted to grip said workpiece by applying radially inward and outward force to the workpiece as required wihtout application of bending moments to jaw portions of said chuck, comprising:

a. a chuck body centered on an axis of rotation, adapted to slideably receive a plunger, said chuck body having a plurality of equiangularly spaced radial slots with a like plurality of generally axially extending guide bores opening into said radial slots, said guide bores including guide surfaces adapted to slideably contact and support respective radially inner and outer load bearing surfaces of jaw activating wedge means moved by said plunger as said chuck moves against a workpiece to exert radial force thereagainst;

b. said plunger being axially slideably resident within said body;

c. jaw members radially slideable in respective ones of said radial slots and including recesses confronting said respective guide bores, said recesses having parallel camming surfaces sloping towards said axis;

d. circumferentially equiangularly spaced generally axially extending wedge means including central camming portions of relatively reduced thickness and canted radially inwardly relative to said plunger; said reinforcing portions and said canted central camming portion defining an I-beam-like wedge supporting beam structure, with said canted central camming portio corresponding to a web of said I-beam, said reinforcing portions of said wedge members slideably engaging said guide surfaces of said chuck body over the range of axial movement of said plunger so that when said body supports said wedge members, positions of contact at both axial ends of a jaw within said chuck body become fulcrum points; each jaw operatively engaging a camming portion of one of said wedge means at the axial midpoint of said jaw to radially move along said radial slot in said body in response to axial movement of said wedge means.

3. A precision chuck comprising:

a chuck body formed in one-piece and having a plurality of dove-tail grooves radially formed therein;

a plunger having a plurality of wedges and being slidable in an axial direction of the chuck body;

a plurality of jaws interlocked with the movement of the plunger and having a plurality of dove-tail projections to be guided to said dove-tail grooves of the chuck body, each of said wedges having a wedge main body and a wedge reinforcing portion projected in a circumferential direction of the wedge main body, said wedge main body having a guide surface which is always in slide-contact with guide surfaces provided on at least both ends of the wedge main body along an entire range of motion movement of said wedge main body in the axial direction of said chuck body; and said wedge portion engaging with its corresponding jaw between axial ends of the wedge body.

4. A precision chuck as set forth in claim 1, wherein said wedges are formed integral with said plunger.

5. A precision chuck as set forth in claim 1, wherein said wedges and said plunger are fabricated as separate component parts.

6. A precision chuck as set forth in claim 1, wherein said wedge and said engaging portion of said jaw have a trapezoidal cross sectional configuration.

7. A precision chuck as set forth in claim 6, wherein the groove of said body for engagement with said wedge is defined by a blind hole whose bottom is spaced apart by a suitable distance from the front portion of said body.

8. A precision chuck as set forth in claim 1, wherein the wedge main body of said wedge has an arcuate cross sectional configuration; and a reaction force which acts on the wedge main body from the center of a pressure receiving surface of the jaw which is pressed by the wedge portion of the wedge main body is directed to pass the center of the arc of the wedge main body.

9. A precision chuck according to claim 3, wherein the engaging portion of each jaw with said wedge portion is formed on a radially central portion of the jaw.

10. A precision chuck according to claim 3, wherein a bearing surface for supporting a circumferential surface of said wedge main body is formed on a slide-contact surface between the guide surface of said chuck body and a corresponding guide surface of said wedge main body.

11. A precision chuck according to claim 3, wherein the wedge main body and the wedge reinforcing portion of said wedges are jointed at the base in the shape of a fork end.

12. A precision chuck according to claim 3, wherein the wedges and a piston making up said plunger are separate structures.

13. A precision chuck according to claim 3, wherein the wedges and a piston making up said plunger are in one-piece.

14. A precision chuck according to claim 3, wherein the engaging portion between said wedge portion and its corresponding jaw is serrated in trapezoidal cross-section.

15. A precision chuck according to claim 3, wherein slide-contact grooves for the wedges formed in said body are defined in blind holes closed by a thickness on the side of the jaws in the axial direction of said body.

16. A precision chuck according to claim 3, wherein said wedge main body has arcuate section, and an action line of a reaction force acting from the center of a pressure receiving surface of its corresponding jaw pressed by said wedge portion onto the wedge main body is directed to pass the center of an arc of the wedge main body.

17. A precision chuck according to claim 3, wherein the dove-tail grooves of said chuck body are extended into guide grooves with guide surfaces for supporting said jaws at a forward portion in the axial direction of said body.

* * * * *

UNITED STATES PATENT AND TRADEMARK OFFICE
CERTIFICATE OF CORRECTION

PATENT NO. : 4,735,422
DATED : 4/5/88
INVENTOR(S) : Yoshihito Kurogi; Hiroshima, Japan
Tatsuei Sawaguchi; Hiroshima, Japan It is certified that error appears in the above-identified patent and that said Letters Patent is hereby corrected as shown below:

Title page:

Assignee's Address is as follows:

Hiroshima, Japan

Signed and Sealed this

Fifteenth Day of November, 1988

Attest:

DONALD J. QUIGG

Attesting Officer   Commissioner of Patents and Trademarks